US008384360B2

(12) United States Patent
Cegnar et al.

(10) Patent No.: US 8,384,360 B2
(45) Date of Patent: Feb. 26, 2013

(54) HYBRID BATTERY

(76) Inventors: Erik J. Cegnar, Moscow, ID (US); Erin C. Jessup, Moscow, ID (US); Fred L. Jessup, Moscow, ID (US); Benton K. O'Neil, Syracuse, NY (US)

( * ) Notice: Subject to any disclaimer, the term of this patent is extended or adjusted under 35 U.S.C. 154(b) by 669 days.

(21) Appl. No.: 11/912,977

(22) PCT Filed: Apr. 27, 2006

(86) PCT No.: PCT/US2006/016913
§ 371 (c)(1),
(2), (4) Date: Jul. 9, 2009

(87) PCT Pub. No.: WO2006/116774
PCT Pub. Date: Nov. 2, 2006

(65) Prior Publication Data
US 2009/0261787 A1  Oct. 22, 2009

Related U.S. Application Data

(60) Provisional application No. 60/675,555, filed on Apr. 27, 2005.

(51) Int. Cl.
*H02J 7/16* (2006.01)
*H02J 7/04* (2006.01)

(52) U.S. Cl. ......... 320/166; 320/167; 320/140; 320/104

(58) Field of Classification Search ................... 320/167, 320/166, 140, 128, 104, 134, 135, 136, 137, 320/138
See application file for complete search history.

(56) References Cited

U.S. PATENT DOCUMENTS

| | | | |
|---|---|---|---|
| 4,723,105 A | 2/1988 | Matouka | |
| 4,862,009 A | 8/1989 | King | |
| 5,214,358 A | 5/1993 | Marshall | |
| 5,345,154 A | 9/1994 | King | |
| 5,586,613 A | 12/1996 | Ehsani | |
| 5,589,743 A | 12/1996 | King | |
| 5,710,699 A | 1/1998 | King et al. | |
| 5,722,911 A | 3/1998 | Ibaraki | |
| 5,723,956 A | 3/1998 | King | |
| 5,734,258 A * | 3/1998 | Esser | 323/224 |
| 5,898,282 A | 4/1999 | Drozdz | |
| 5,910,722 A | 6/1999 | Lyons | |
| 5,931,757 A * | 8/1999 | Schmidt | 475/2 |
| 6,075,331 A * | 6/2000 | Ando et al. | 318/376 |
| 6,160,382 A | 12/2000 | Yoon | |
| 6,265,851 B1 * | 7/2001 | Brien et al. | 320/162 |
| 6,323,608 B1 | 11/2001 | Ozawa | |
| 6,449,537 B1 | 9/2002 | Phillips | |
| 6,740,002 B1 | 5/2004 | Stridsberg | |
| 6,781,256 B2 | 8/2004 | Loechner | |
| 6,791,295 B1 | 9/2004 | Berels | |
| 6,836,098 B1 | 12/2004 | O'Brien | |
| 6,868,318 B1 | 3/2005 | Cawthorne | |
| 6,909,201 B2 | 6/2005 | Murty | |
| 6,923,279 B2 * | 8/2005 | Shimane et al. | 180/65.1 |
| 6,936,991 B2 | 8/2005 | Chen | |

(Continued)

*Primary Examiner* — Edward Tso
*Assistant Examiner* — Alexis Boateng
(74) *Attorney, Agent, or Firm* — Buchanan Nipper

(57) ABSTRACT

A hybrid battery includes a converter, a controller, a power source, and an ultracapacitor configured to be discharged. The converter is operable to receive a control signal and to regulate a current level that is allowed to be drawn from the power source to charge the ultracapacitor in accordance with the control signal. The controller is operable to generate and provide the control signal to the converter. The controller is operable to generate the control signal based at least in part on a measure of the voltage level of the ultracapacitor and a measure current being drawn to charge the ultracapacitor.

20 Claims, 4 Drawing Sheets

U.S. PATENT DOCUMENTS

| | | |
|---|---|---|
| 6,946,818 B2 | 9/2005 | Cawthorne |
| 6,978,854 B1 * | 12/2005 | Kuang et al. ............. 180/65.235 |
| 6,982,499 B1 | 1/2006 | Kachi |
| 7,004,273 B1 * | 2/2006 | Gruenwald et al. ..... 180/65.245 |
| 7,085,123 B2 * | 8/2006 | Shiue et al. ................ 361/301.2 |
| 7,487,851 B2 * | 2/2009 | Buck et al. ............... 180/65.265 |
| 2004/0020286 A1 | 2/2004 | Blakley et al. |
| 2004/0251880 A1 | 12/2004 | O'Brien |
| 2005/0040789 A1 | 2/2005 | Salasoo |
| 2005/0077867 A1 | 4/2005 | Cawthorne et al. |
| 2005/0077877 A1 | 4/2005 | Cawthorne |
| 2005/0179412 A1 | 8/2005 | Sebille |
| 2005/0225293 A1 | 10/2005 | Hacsi |
| 2006/0028778 A1 | 2/2006 | O'Gorman |
| 2006/0061922 A1 * | 3/2006 | Mihai et al. ..................... 361/20 |

* cited by examiner

HYBRID BATTERY

CROSS REFERENCE TO RELATED APPLICATIONS

This application claims the priority of PCT application US2006/016913 filed Apr. 27, 2007 which claims priority of U.S. provisional application Ser. No. 60/675,555 filed Apr. 27, 2005.

BACKGROUND

Conventional lead-acid chemistry has several characteristics that limit their performance as an SLI (starting-lighting-ignition) battery in vehicles. In cold temperatures the capacity and ability to supply power for starting is significantly reduced. In temperatures above 120° F. lead-acid batteries can be damaged. Depending on how the battery is used its life can be relatively short necessitating frequent replacement. High starting currents and deep cycling are factors that contribute to reduction in cycle-life of batteries. This type of use is seen particularly in diesel military vehicles and semi trucks. Although there is a recycling infrastructure in place for lead-acid batteries, there is a significant environmental impact from the manufacturing and disposal of SLI batteries.

DRAWINGS

DETAILED DESCRIPTION

INTRODUCTION: Various embodiments described below provide for a hybrid battery is the combination of an electrochemical battery with ultracapacitors and digitally controlled power electronics. The pairing of these two energy storage devices provides the high power output of ultracapacitors with the high-energy storage of batteries. Significant improvements in performance and life cycle can be achieved by accurately controlling the energy out of the battery while taking advantage of the high power capabilities of ultracapacitors.

Although the various embodiments disclosed herein will be described with reference to use in starting a vehicle, the hybrid battery is not so limited. The hybrid battery in one or more embodiments may be utilized in any environment in which it may be desirable to incorporate a relatively high capacity energy storage device capable of producing a relatively high output power level. Examples of such uses include other engine starters, standby generators, and auxiliary power units.

Figure 1:
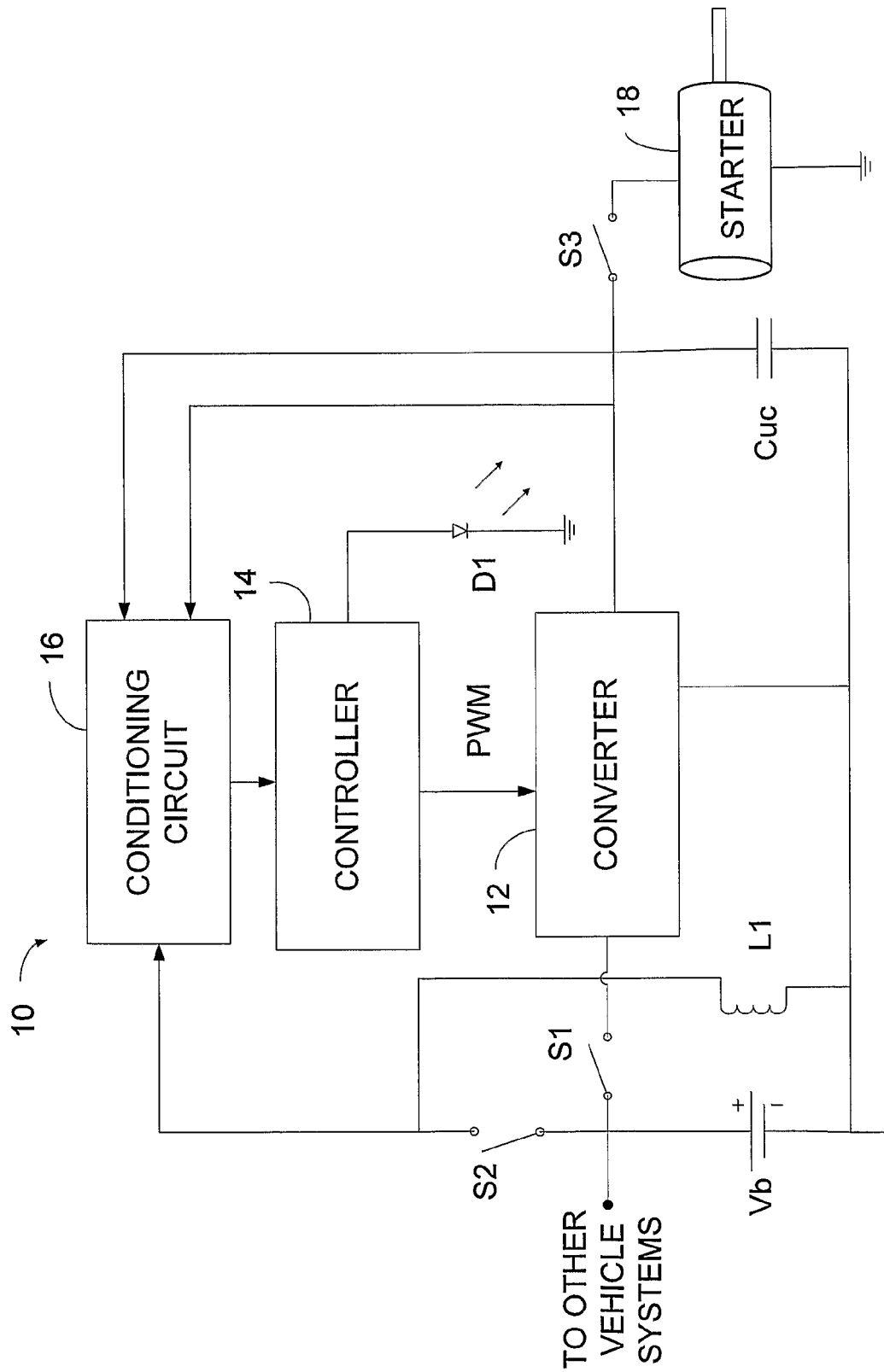
FIG. 1 is a schematic view of an exemplary hybrid battery integrated in to a starting subsystem of a vehicle according to an embodiment.

THE HYBRID BATTERY: FIG. 1 illustrates an exemplary hybrid battery 10 integrated into a vehicle's starting subsystem. Hybrid battery 10 includes a power source such as battery (Vb), ultracapacitor (Cuc), a relay made up switch (S1) and actuating coil (L1), light emitting diode (D1), Converter 12, controller 14, and conditioning circuit 16. The vehicle's starting subsystem includes key ignition switch (S2), starting solenoid (S3), and starter (18). The relay is configured to close switch (S1) upon the closing or switch (S2) by, for example, the turning of a key in a vehicle's ignition.

The large currents drawn by starter 18 are supplied by the ultracapacitor (Cuc). Energy is transferred from the battery (Vb) to the ultracapacitor (Cuc) through Converter 12. The amount of current transferred from the battery (Vb) to the ultracapacitor (Cuc) is controlled by controller 14. In this embodiment, controller 14 performs closed loop proportional-integral (PI) current control. The result of this control is a pulse width modulated (PWM) signal to Converter 12. Regulating the current from battery (Vb) and preventing large current spikes can help extend the life of battery (Vb). Hybrid Battery 10 is able to better supply relatively high power levels at relatively cold temperatures as ultracapacitor (Cuc) are affected less by cold temperatures than conventional lead acid SLI batteries.

During starting of a vehicle's engine, the total energy of the ultracapacitor (Cuc) vs time drops because more current leaves the ultracapacitor (Cuc) than is supplied by the battery (Vb) via Converter 12. Light emitting diode (D1) indicates to the user when the ultracapacitor (Cuc) are charged. Starter 18 can be utilized to start a vehicle's engine when the LED indicates a sufficient charge.

Converter 12 represents generally any component or combination of components capable of regulating the level of current that can be drawn from the battery (Vb) to charge the ultracapacitor (Cuc) according to a control signal received from controller 14. Controller 14 represents generally any component or combination of components that can supply converter 12 with a control signal where that control signal is generated according to one or more electrical characteristics of the ultracapacitor (Cuc). For example, when the voltage level of the ultracapacitor (Cuc) falls below a low threshold value, controller 14 may generate a control signal that causes DC-DC converter 14 to allow ultracapacitor (Cuc) to draw a current from the battery (Vb). When the voltage level of the ultracapacitor (Cuc) rises above a high threshold value, controller 14 may generate a control signal that causes DC-DC converter 14 to stop allowing the ultracapacitor (Cuc) to draw a current from the battery (Vb).

Conditioning circuit 16 represents a component or combination of components that operate to scale, add, subtract, and/or filter signals from the battery (Vb), ultracapacitor (Cuc), and Converter 12 and for use by controller 14. In other words, conditioning circuit 16 acts on the various signals so that controller 14 can discern a current output of Converter and the voltages of the battery (Vb) and the ultracapacitor (Cuc).

Figure 2:
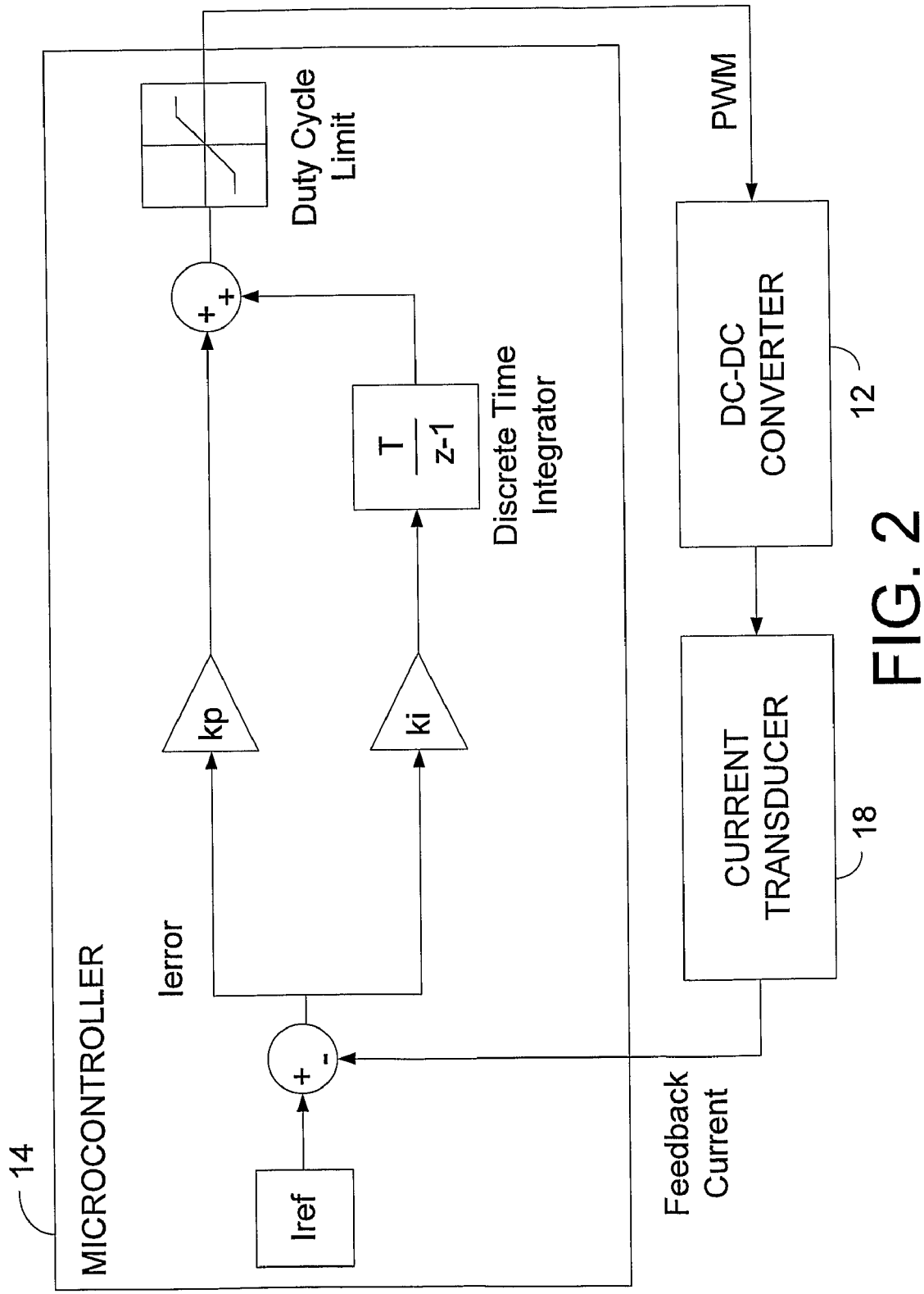
FIG. 2 is a schematic view of an exemplary controller according to an embodiment.

THE CONTROLLER: FIG. 2 illustrates an exemplary control loop system implemented by controller 14. In this Example, controller is a commercially available microcontroller such as a PIC18F452. In this example, controller 14 reads battery voltage and current at the output of Converter 12 as well as the voltage of ultracapacitor (Cuc). When the voltage of the ultracapacitor (Cuc) drops below a predetermined low threshold value, controller 14 commands a current (Iref) to a closed loop interrupt function. The interrupt function performs closed loop control to operate Converter 12 at a commanded current. Current transducer 18 represents a component of combination of components that can be used to measure the current exiting Converter 12.

After an engine starts, for example, no current leaves the ultracapacitor (Cuc). Current continues to enter the ultracapacitor (Cuc) via Converter 12 causing the voltage level of the ultracapacitor (Cuc) to increase with respect to time. When the voltage of the ultracapacitor (Cuc) increases to a predetermined high threshold value, controller 14 stops commanding the reference current (Iref) to the interrupt function causing Converter 12 to stop providing current to the ultracapacitor (Cuc). This hysteretic control with separate turn off and turn on thresholds prevents oscillations that could otherwise occur as the ultracapacitor (Cuc) voltage approached a single threshold.

Figure 3:
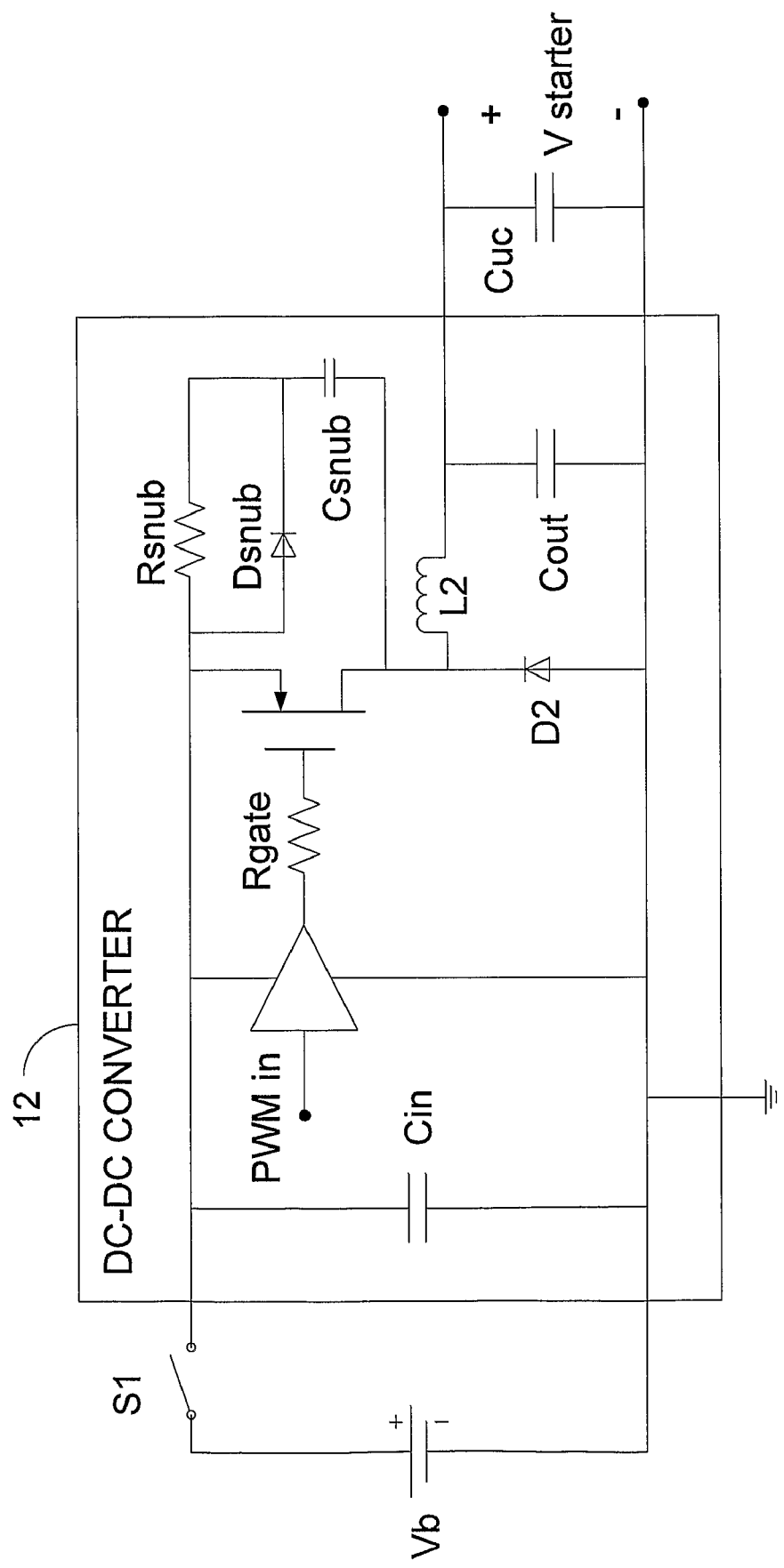
FIG. 3 is a schematic view of an exemplary Converter according to an embodiment.

THE CONVERTER: FIG. 3 is a schematic view of an exemplary implementation of Converter 12. In this example, Converter 12 is a DC-DC buck converter. As in FIG. 1, converter 12 receives a control signal (PWM) from controller 14 which it uses to regulate the level of current that is drawing from the battery (Vb) to charge the ultracapacitor (Cuc).

Figure 4:
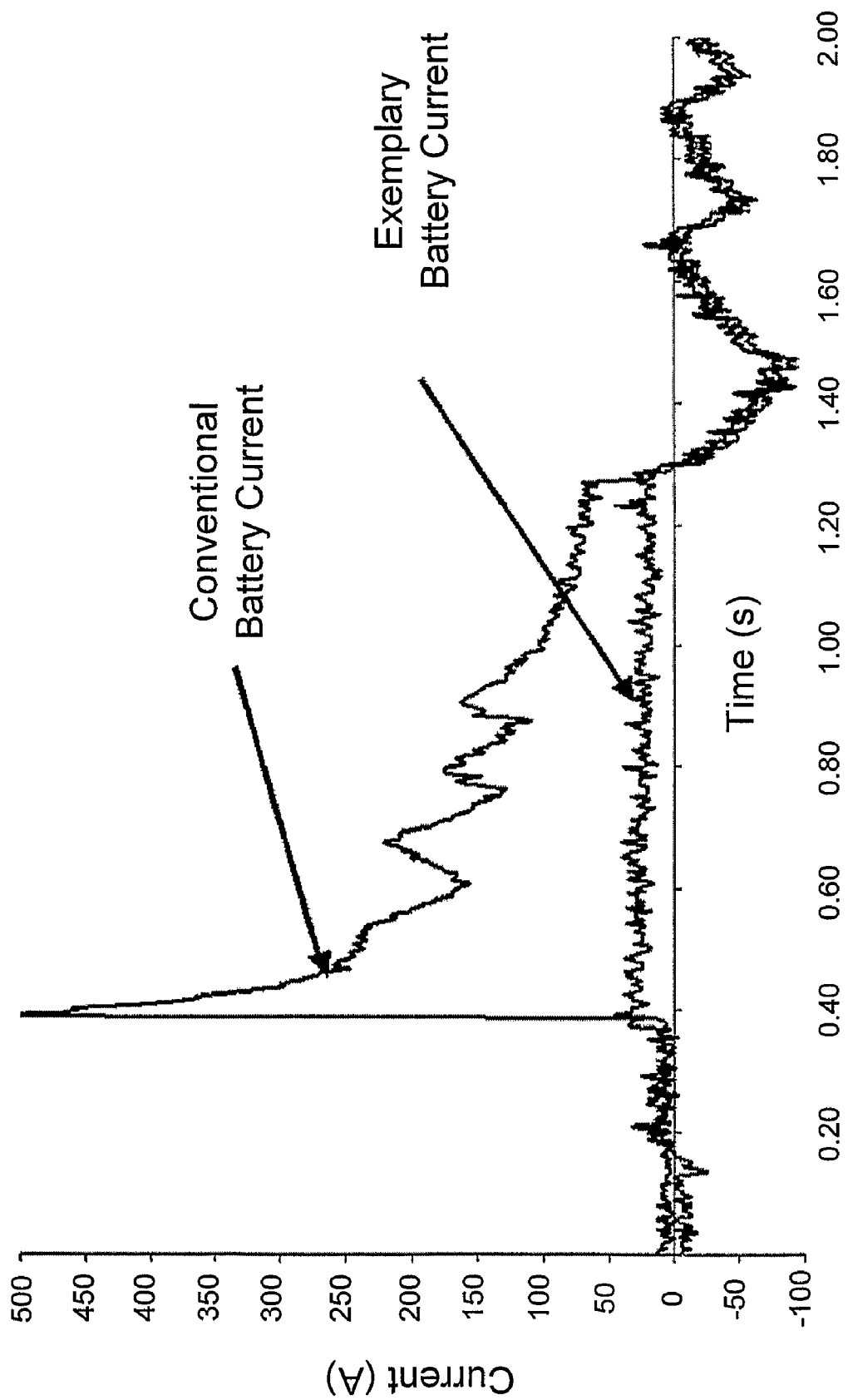
FIG. 4 is a diagram charting the experimental current draw on a conventional battery compared to the experimental current draw of an exemplary hybrid battery.

CURRENT DRAW COMPARISON: FIG. 4 is a diagram charting the experimental current draw on a conventional battery compared to the experimental current draw of an exemplary hybrid battery. The conventional battery starting current was tested in a 2002 Ford Explorer. Current drawn from the battery during starting spiked to approximately 500 amperes. With the hybrid battery 10 of FIGS. 1-3 installed, current drawn from battery (Vb) during engine start ware zero and maximum battery current levels at other times were a maximum design value of 30 amperes.

It is noted that the maximum design value for current in and out of the battery (Vb) is a function of the designs of controller 14 and Converter 12. Specifications for this maximum current value depends on system components such as the type and characteristics of the battery (Vb) and the particular electronic components used to constrict Converter 12.

CONCLUSION: The present invention has been shown and described with reference to the foregoing exemplary embodiments. It is to be understood, however, that other forms, details and embodiments may be made without departing from the spirit and scope of the invention that is defined in the following claims.

What is claimed is:

1. A hybrid battery, comprising:
    a power source;
    an ultracapacitor at least indirectly coupled to a starter, said ultracapacitor configured to be discharged to said starter;
    a voltage converter operable to receive a control signal and to regulate a current level that is allowed to be drawn from the power source to charge the ultracapacitor in accordance with the control signal; and
    a controller operable to generate and provide the control signal to the voltage converter, wherein the controller is operable to generate the control signal based at least in part on a measure of the voltage level of the ultracapacitor and a measure current being drawn to charge the ultracapacitor.

2. The hybrid battery of claim 1, wherein the controller is operable to selectively generate the control signal based upon detecting a low threshold voltage for the ultracapacitor and to selectively stop generating the control signal upon detecting a high threshold voltage level for the ultracapacitor, wherein the low threshold voltage is different than the high threshold voltage.

3. The hybrid battery of claim 1 wherein said ultracapacitor is configured to be discharged to said starter upon activation of an ignition switch.

4. The hybrid battery of claim 1, wherein the control signal is a pulse width modulated control signal.

5. The hybrid battery of claim 1, wherein the controller is operable to perform closed loop proportional-integral current control creating a pulse width modulated control signal to the voltage converter, and wherein the voltage converter is operable to regulate the level of current that is allowed to be drawn from the power source to charge the ultracapacitor based at least in part on characteristics of the pulse width modulated control signal.

6. The hybrid battery of claim 5, wherein the controller is operable to generate the pulse width modulated control signal to have characteristics determined at least in part according to a measure of the voltage level of the ultracapacitor and a measure of the current being drawn to charge the ultracapacitor.

7. The hybrid battery of claim 1, wherein the voltage converter is a DC-DC buck converter, and wherein the power source is a battery.

8. A vehicle starting system, comprising:
    an ultracapacitor at least indirectly coupled to a starter and configured to discharge to the starter;
    a power source for supplying a charging current to the ultracapacitor;
    a voltage converter operable to receive a control signal and to regulate the charging current in accordance with the control signal; and
    a controller operable to generate and provide the control signal to the voltage converter, wherein the controller is operable to generate the control signal based at least in part on a measure of the voltage level of the ultracapacitor and a measure of the charging current.

9. The system of claim 8, wherein the ultracapacitor is configured to discharge to the starter upon activation of the vehicle's a key ignition switch.

10. The system of claim 8, wherein the controller is operable to selectively generate the control signal based upon detecting a low threshold voltage for the ultracapacitor and to selectively stop generating the control signal upon detecting a high threshold voltage level for the ultracapacitor, wherein the low threshold voltage is different than the high threshold voltage.

11. The system of claim 8, wherein the power source is a battery.

12. The system of claim 8, wherein the control signal is a pulse width modulated control signal.

13. The system of claim 8, wherein the controller is operable to perform closed loop proportional-integral current control creating a pulse width modulated control signal to the voltage converter, and wherein the voltage converter is operable to regulate the level of current that is allowed to be drawn from the power source to charge the ultracapacitor based at least in part on characteristics of the pulse width modulated control signal.

14. The system of claim 13, wherein the controller is operable to generate the pulse width modulated control signal to have characteristics determined at least in part according to a measure of the voltage level of the ultracapacitor and a measure of the current being drawn to charge the ultracapacitor.

15. The system of claim 8, wherein the voltage converter is a DC-DC buck converter.

16. The hybrid battery of claim 1, wherein the controller is operable to selectively generate the control signal based upon detecting a low threshold voltage for the ultracapacitor and to selectively stop generating the control signal upon detecting a high threshold voltage level for the ultracapacitor, and wherein the low threshold voltage is different than the high threshold voltage, and wherein the control signal is a pulse width modulated control signal.

17. The hybrid battery of claim 1, wherein the control signal is a pulse width modulated control signal, wherein the controller is operable to perform closed loop proportional-integral current control creating a pulse width modulated control signal to the converter, wherein the converter is operable to regulate the level of current that is allowed to be drawn from the power source to charge the ultracapacitor based at least in part on characteristics of the pulse width modulated control signal, and wherein the controller is operable to generate the pulse width modulated control signal to have characteristics determined at least in part according to a measure of the voltage level of the ultracapacitor and a measure of the current being drawn to charge the ultracapacitor.

18. The hybrid battery of claim 1, wherein the controller is operable to selectively generate the control signal based upon detecting a low threshold voltage for the ultracapacitor and to selectively stop generating the control signal upon detecting a high threshold voltage level for the ultracapacitor, wherein the low threshold voltage is different than the high threshold voltage, wherein the control signal is a pulse width modulated control signal, and wherein the converter is a DC-DC buck converter.

19. The hybrid battery of claim 1, wherein the controller is operable to selectively generate the control signal based upon detecting a low threshold voltage for the ultracapacitor and to selectively stop generating the control signal upon detecting a high threshold voltage level for the ultracapacitor, wherein the low threshold voltage is different than the high threshold voltage, wherein the control signal is a pulse width modulated control signal, wherein the converter is a DC-DC buck converter, and wherein the controller is operable to perform closed loop proportional-integral current control creating a pulse width modulated control signal to the converter, and wherein the converter is operable to regulate the level of current that is allowed to be drawn from the power source to charge the ultracapacitor based at least in part on characteristics of the pulse width modulated control signal.

20. A hybrid battery for a vehicle having an engine, a starter and a key ignition switch, said hybrid battery comprising:
  a power source, wherein the power source is a battery;
  an ultracapacitor at least indirectly coupled to said starter, said ultracapacitor configured to be discharged to the starter upon activation of an ignition switch, starting said vehicle's engine;
  a voltage converter operable to receive a control signal and to regulate a current level that is allowed to be drawn from the power source to charge the ultracapacitor in accordance with the control signal, wherein the converter is a DC-DC buck converter; and
  a controller operable to generate and provide the control signal to the voltage converter, wherein the controller is operable to generate the control signal based at least in part on a measure of the voltage level of the ultracapacitor and a measure current being drawn to charge the ultracapacitor, wherein the controller is operable to selectively generate the control signal based upon detecting a low threshold voltage for the ultracapacitor and to selectively stop generating the control signal upon detecting a high threshold voltage level for the ultracapacitor, wherein the low threshold voltage is different than the high threshold voltage, wherein the control signal is a pulse width modulated control signal;
  wherein the controller is operable to perform closed loop proportional-integral current control creating a pulse width modulated control signal to the converter, and wherein the converter is operable to regulate the level of current that is allowed to be drawn from the power source to charge the ultracapacitor based at least in part on characteristics of the pulse width modulated control signal; and
  wherein the controller is operable to generate the pulse width modulated control signal to have characteristics determined at least in part according to a measure of the voltage level of the ultracapacitor and a measure of the current being drawn to charge the ultracapacitor.

* * * * *

UNITED STATES PATENT AND TRADEMARK OFFICE
CERTIFICATE OF CORRECTION

PATENT NO. : 8,384,360 B2  Page 1 of 1
APPLICATION NO. : 11/912977
DATED : February 26, 2013
INVENTOR(S) : Cegnar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this
First Day of September, 2015

Michelle K. Lee
*Director of the United States Patent and Trademark Office*